United States Patent [19]

Bargen

[11] 3,890,638

[45] June 17, 1975

[54] COLOR PHASE MATCHING SYSTEM FOR MAGNETIC VIDEO TAPE RECORDINGS

[75] Inventor: David W. Bargen, San Jose, Calif.

[73] Assignee: CMX Systems, Sunnyvale, Calif.

[22] Filed: Aug. 22, 1973

[21] Appl. No.: 390,577

[52] U.S. Cl. .......... 358/8

[51] Int. Cl. .......... H04n 9/02

[58] Field of Search.. 178/5.4 CD, 5.4 SY, 69.5 CB; 358/8

[56] References Cited

UNITED STATES PATENTS

| | | | |
|---|---|---|---|
| 3,562,413 | 2/1971 | Coleman | 178/5.4 CD |
| 3,684,826 | 8/1972 | Hurst | 178/5.4 CD |
| 3,735,015 | 5/1973 | Mesak | 178/5.4 CD |

*Primary Examiner*—Richard Murray
*Attorney, Agent, or Firm*—Limbach, Limbach, & Sutton

[57] ABSTRACT

Color burst phase matching is achieved in magnetic video tape recording by coding the recording tape to identify alternate video frames to provide a synthetic color phase reference, comparing this synthetic color phase reference with a system frame reference and, based upon the comparison, controlling the tape speed or position relative to the system frame reference when required to achieve the proper color phase relationship.

16 Claims, 7 Drawing Figures

COLOR PHASE MATCHING SYSTEM FOR MAGNETIC VIDEO TAPE RECORDINGS

BACKGROUND OF THE INVENTION

The present invention relates to recording and editing of magnetic video tape color recordings and, in particular, to an improved system for insuring proper color burst phase matching during recording.

Electronic splicing of television magnetic tape containing composite NTSC or PAL color signals is complicated by the nature of the television signal itself, and by the manner in which the standard video tape recorder (VTR) processes the signal on playback.

In the NTSC system, the color burst phase differs 180° from one line of video to the next. This is because the color subcarrier frequency is a 455/2 multiple of the horizontal scanning frequency. That is, for each two lines of video, the subcarrier is able to complete a whole number of cycles. Consequently, succeeding frames of NTSC video have opposite burst phases, when compared on a line-for-line basis, and four television fields must occur before the unmodulated subcarrier exactly repeats itself.

In the PAL system, the combination of the 90° alternating burst and the 90° dropping back of the burst phase causes consecutive pairs of lines to have the same burst phase, and adjacent pairs to be 180° out of phase. Because each frame has an odd number of lines, 625, four PAL video frames, eight video fields, are required before the burst phase repeats itself, line-for-line, within a frame.

If a continuous signal is to be reproduced, splices must join succeeding color frames. If they do not, there will be an abrupt 180° shift of burst and chroma at the splice, which can adversely affect, for example, some modes of editing.

Thus, for either the NTSC or PAL systems, when new video signals are to be recorded on a VTR following a previously recorded segment, the VTR has a 50–50 chance of locking to the correct color frame. This is discussed in greater detail in "The Problems of Splicing and Editing Color Video Magnetic Tape", by C. A. Anderson, *IEEE Transactions on Broadcasting*, Vol. BC-15, No. 3, September 1969, pp. 59–61.

Thus, one-half of the time, the VTR locks up with a frame of the video which has its color burst 180° out of phase with that which was previously recorded. For an ordinary, uninterrupted replay, this presents no problem. But, if a number of video segments are mixed and sequentially recorded, serious difficulties are encountered. As the video head moves from old recording to new recording during replay of the edited tape, a 180° phase shift is encountered with respect to sync at the edit point, and the VTR time base correction circuits, to compensate, insert or remove a 140 ns delay, causing the picture to jump sideways.

This effect is not disturbing if such edits are only occasional, particularly if the scene content changes. But if there is a series of closely spaced splices or if there is animation, the picture continually hops back and forth. At worst, a complete break-up of the picture occurs.

Several approaches have been suggested or implemented to overcome this color phase matching problem. Several of these are discussed in the Anderson article referred to above. The way which is most commonly used involves changing the edit point by one frame, in the case of NTSC, or two frames for PAL, if improper color phase matching occurs. This technique involves the following steps.

First, when a video signal is to be recorded by the VTR, it is provided to the VTR in the usual manner and the conventional synchronization process begins. The sync pulses from the recording tape are compared with the plant reference sync pulses. Any phase deviation results in regulation of the VTR capstan tape drive to regulate the tape speed so that the tape sync pulses are in phase with the reference sync pulses.

Next, the tape color burst signal is compared with the plant color burst reference, a 3.58 MHz subcarrier. Since the phase of the tape color burst varies because of time-base instabilities, a delay is introduced or deleted to compensate for these time-base instabilities, so that the tape color burst is synchronized with the 3.58 MHz plant reference.

At this point, there is a 50–50 chance that the VTR has locked to the correct color frame, as explained previously. A signal is developed to indicate which of these two conditions occurs. If there is a phase mismatch, the tape capstan drive speed is altered so that the VTR tape "slips" one frame relative to the plant reference, and the entire synchronization process is repeated, but with proper color framing.

This technique has a number of significant disadvantages. First, when editing, all playback VTR's, i.e. those VTR's containing the scenes to be edited, are normally slaved to the plant reference signal and the color burst is automatically in phase with the plant color burst. The effect of causing the record VTR tape to slip back relative to the plant color reference to bring about proper color framing is that it also slips back relative to the playback VTR's and so the edit point is shifted by one frame, in the case of NTSC, or two frames in the case of PAL. Many editors, concerned with the aesthetics of the composite edited tape, object to alteration of edit points, even if it is only by one frame.

Secondly, this approach relies upon some method of detecting, at the beginning of each recording, the color phase to see if a frame slip is required. For example, sensing a phase error voltage or sync timing signal is required, which experience has shown requires frequent, critical adjustment.

Third, the "detect-and-bump" cycle, during the 50 percent of the times when color framing is required, introduces a 4-5 second delay into the editing sequence, and the worst case condition must be allowed for in judging roll timing.

Fourth, the color phase, the very thing which is sensed immediately after initial synchronization is most disturbed at that very moment in time. Therefore, poor editing results frequently occur where a series of closely spaced edits occur. The undesirable alternative is to sequence or space the edit points.

Examples of this type of system are the Ampex Color Framing Accessory and the device described in U.S. Pat. No. 3,594,498.

SUMMARY OF THE INVENTION

It is, therefore, an object of the invention to provide an improved magnetic video tape recording system which insures proper color burst phase matching.

Another object of the invention is to provide an improved color framing system which does not introduce unnecessary time delays into the recording process.

Another object of the invention is to provide an improved color framing system for a magnetic tape editing assembler which enables proper color phase matching without altering the frame number at which the edit is made.

Another object of the invention is to provide an improved color burst phase matching system which is compatible with different VTR's and different video recording formats.

Another object of the invention is to provide a VTR with improved means for color phase framing with incoming color video signals.

Another object of the invention is to provide improved means for enabling editing of closely spaced editing points while maintaining color phase burst integrity.

In accordance with the present invention, proper color framing utilizes a time or frame code associated with the tape as a synthetic phase reference, to identify alternate frames. This identification is independent of the actual color phase. That is, the alternate frames on the tape having 0° and 180° nominal phase conditions, may have, for example, an odd or even frame identification. But the same relationship is consistent throughout a particular record tape.

A system frame reference signal, slaved to the plant or system sync is generated to distinguish alternate frames in time, i.e. alternate frames of the plant sync generator. Most conveniently, this is done by deriving a 15 Hz square wave from the 30 Hz plant sync.

A comparison is made between the synthetic phase reference and the system frame reference prior to beginning the record. If the comparison determines that the two have the proper relationship, the recording is made and the color phases will be correctly matched. If the comparison determines that they have the wrong relationship, then the recording tape speed or position is controlled for correcting the recording tape frame position relative to the system frame reference to achieve the proper relationship between the synthetic phase reference and the system frame reference to achieve proper color framing.

DESCRIPTION OF THE PREFERRED EMBODIMENT

Figure 1:
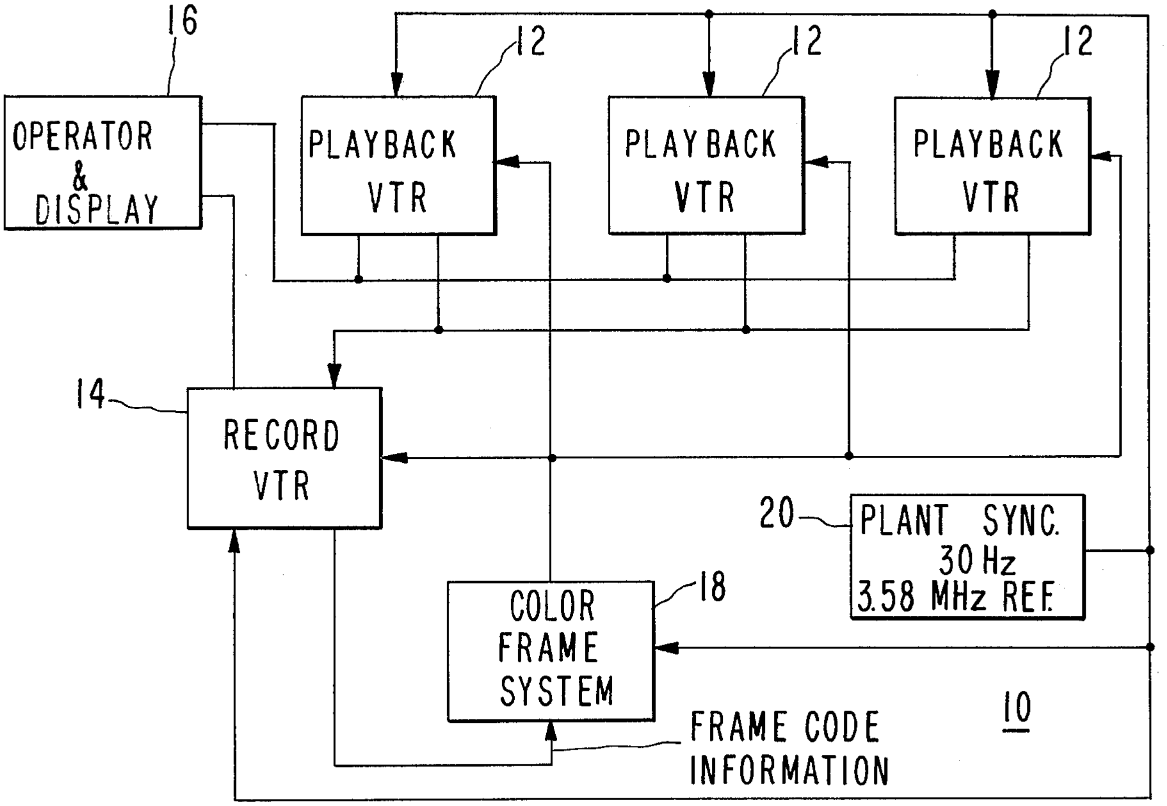
FIG. 1 is a block schematic diagram of a magnetic video tape editing system incorporating the present invention.

Referring to FIG. 1, a typical video magnetic tape editing system 10 is illustrated in block form. A plurality of playback video tape recorders (VTR's) 12 contain previously recorded video segments; for example, different camera recordings of a single scene rehearsed for a television show.

A record VTR 14 records a master or composite tape composed of the sequences selected by the editor as he reviews the "takes" on the playback VTR's 12. An operator control console 16 is used by the editor to control the operation of each of the playback VTR's 12 and the record VTR 14. The console 16 is also provided with a display monitor to enable the editor to see a list of edit characteristics and decisions. One example of such an editing system is the "CMX System/300", manufactured by the assignee of the present invention.

In accordance with the present invention, an improved color frame system 18 is provided to insure that as video segments recorded and stored by playback VTR's 12 are replayed and recorded on the master or composite tape of record VTR 14, there is proper color phase matching or framing between that which has previously been recorded on VTR 14 and that which is to be added.

It should be understood at the outset, however, that the present invention should not be limited to magnetic tape editing applications. As will be explained in more detail later, the present invention has application to other aspects of video recording, such as, for example, direct recording from a live camera or another VTR.

Additionally, the embodiments described herein are based upon the NTSC format. However, it is also to be understood that the principles of the present invention are equally applicable to video applications using the PAL format.

Figure 2:
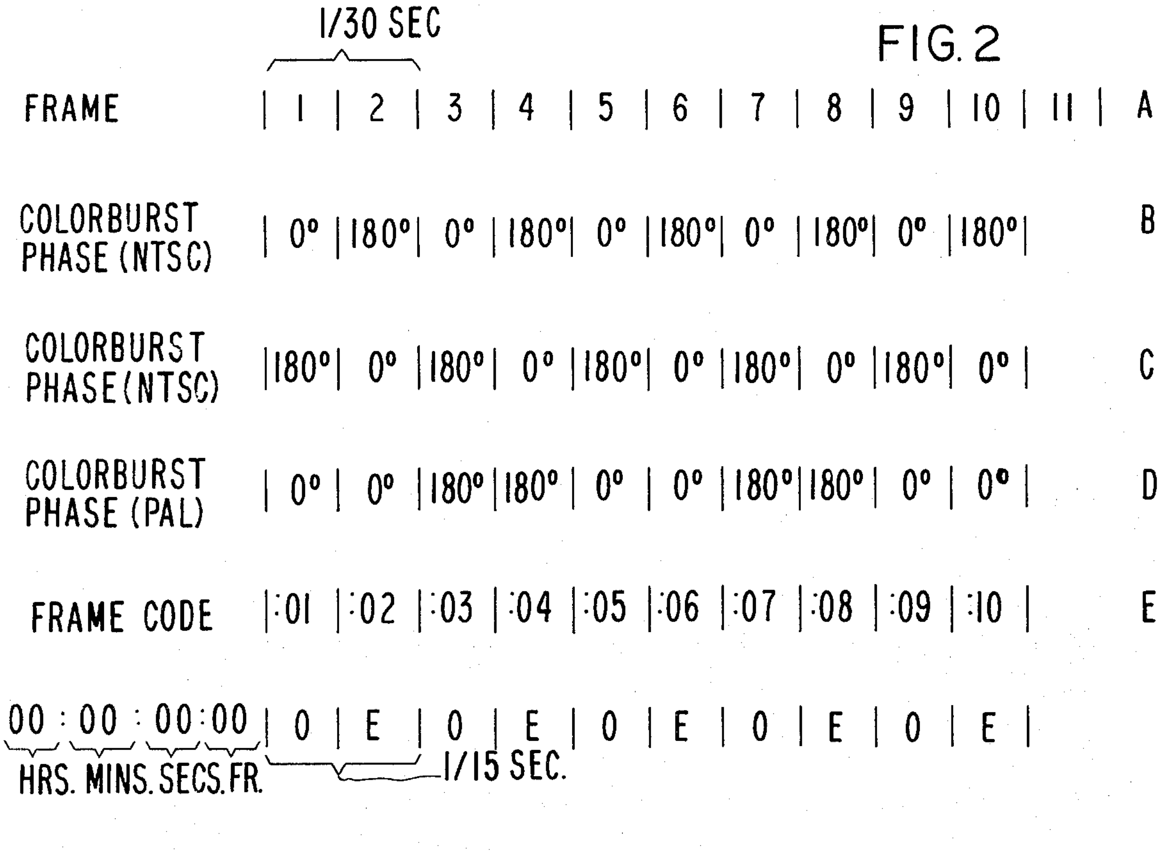
FIG. 2 is a graphical illustration of the relationship of the NTSC code with respect to the actual tape color phase.

The assignment of a frame code to identify alternate frames of video can best be seen by reference to FIG. 2. A sequence of video frames is depicted in FIG. 2A. Each frame is one-thirtieth second in duration and consists of two video fields, each one-sixtieth second in duration in the well-known manner.

With present standards in the video industry, the phase of the color subcarrier with reference to any part of the sync signal is not specified. That is to say, that if one looks at the actual phase at the beginning of a color burst for a given frame, it may have a value anywhere from 0° to 360°. The actual phase at the beginning of a color burst is entirely arbitrary. In the two examples of FIGS. 2B and 2C, the phases are opposite one another for a given frame relative to the frame code of FIG. 2A. It is equally possible for frame 1 to have an actual beginning phase of 60°, frame 2, 240°; frame 3, 60°; etc., or frame 1, 5°; frame 2, 185°; frame 3, 5°; etc., or any other beginning phase value.

But what is important and consistent is that the color subcarrier phase of periodic frames will either be in phase or 180° out of phase. Thus, in FIGS. 2B and 2C, frames 1, 3, 5, etc. are 180° out of phase with frames 2, 4, 6, etc.

For purposes of editing, it is standard practice to identify each recorded frame, normally with audio signals recorded, in the case of a 4-track magnetic recording tape, on the cue track. Although there are many ways in which individual frames can be identified, presently the most commonly used is the SMPTE time code. As a recording is made, each frame is assigned a sequential number representing the hour, minute, second and frame of the recording.

Fig. 2D illustrates the SMPTE time code for 10 frames of a sample recording. As an example, after 30 frames, the "seconds" digits would register ":01", since 30 frames or 15 odd-even frame pairs occur each second.

The SMPTE time code provides a very convenient way of distinguishing alternate frames recorded on the tape. One needs only examine the least significant digit of the frame code to identify "odd" or "even" frames. For binary representations, the former may be designated by a binary ONE and the latter by ZERO.

The operation of the improved color frame system 18 of the present invention will now be explained by reference additionally to FIG. 3. The 30 Hz plant synchronization reference 20 is utilized to synchronize each of the VTR's with each other as well as to force the playback VTR's 12 to be slaved to the record VTR 14. The latter insures that during an editing operation when video information is to be transferred from a playback VTR 12 to a record VTR 14, the beginning of the record will begin at the designated point in time.

The 30 Hz plant sync source 20 is utilized to derive a 15 Hz frame reference signal, by passing the 30 Hz signal through a divide-by-two counter 22. The divide-by-two counter 22 conveniently can be provided as a part of the logic of the editing system, or it may be provided in the record VTR 14. The frame code from the VTR 14 video tape is read out and identified at the start of the synchronization cycle. The frame reference at the projected start of record is then determined at 26 to see whether it is odd or even at the projected start of record.

Comparison means 28 checks to see if the frame code and the frame reference bear the proper relationship, i.e. if proper color phase or frame matching exists. If it does, the regular synchronization process is begun and the recording from the designated playback VTR begins at the projected "start of record", at the proper frame and with the color phase properly matched.

If the comparison means 28 determines that the frame code and the frame reference do not bear the proper relationship, i.e. there will be a color mismatch at the projected "start of record", the "start of record" is delayed at 30 one frame in time. This is accomplished, for example, by slowing down all of the VTR's to "lose" the length of time of one frame, i.e. one-thirtieth sec., assuming the NTSC format.

This has the desired effect of delaying the "start of record" one frame in time thereby effectively reversing the relationship between the frame code and the frame reference at the new "start of record" thereby insuring proper color phase matching. And, since the edit point in terms of frame code is not changed, the edit accuracy is not affected.

Figure 6:
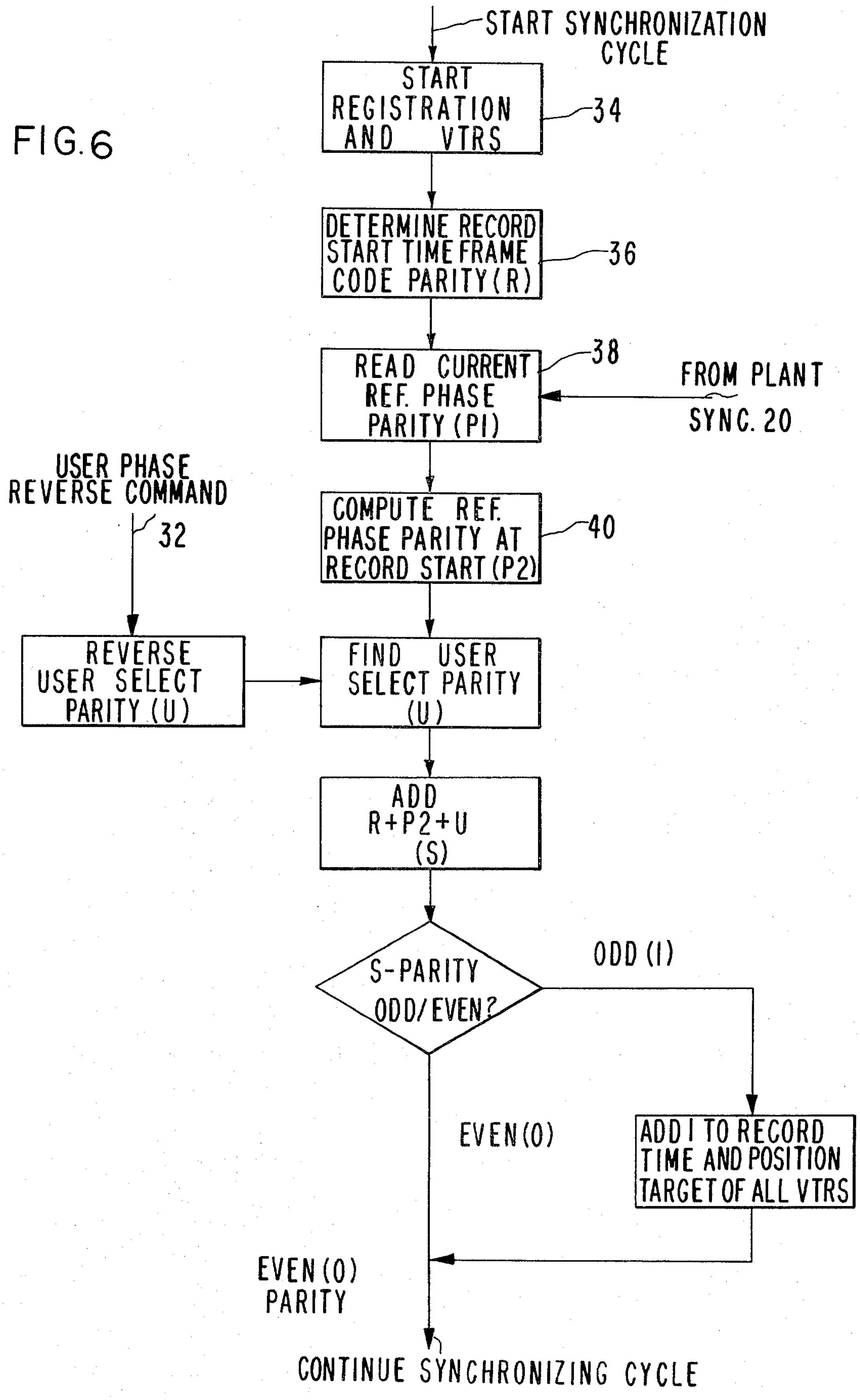
FIG. 6 is a flow diagram of a computer program using the operation of the color frame system depicted in FIG. 3.

A magnetic editing system such as the CMX System 300 uses a small computer serving a number of functions such as storing the tentative and final edit end points, controlling previewing of edit selections, controlling dissolves, fades and special effects, etc. With such an arrangement, it is a simple and straight-forward procedure to program this computer to carry out the functions designated 24, 26 and 28 of FIG. 3. The flow diagram for one such program is depicted in FIG. 6 and is described in greater detail subsequently.

In this manner, the functions carried out by 24, 26 and 28 take place nearly instantaneously at the start of the synchronizing cycle. The regular editing system synchronization process then takes over, whether a delay of the start of record is to occur or not, to force the record VTR 14 to arrive at the right frame at the right time. Thus, the 4–5 sec. "capstan bump" procedure is avoided.

As explained, the playback VTR's 12 are controlled indirectly, since the synchronization process forces them to be slaved to the record VTR 14. This means that the record VTR and playback VTR's will be synchronized together and the start of record will begin at the designated point in time.

The color time base corrector circuitry which is a standard part of any playback VTR suitable for editing corrects the output of the playback VTR's so that the output color burst phase matches the phase of the 3.58 MHz reference 20, independent of the tape color burst phase of record VTR 14. This is accomplished in the well-known manner by inserting a time delay between the tape signal and the output of the VTR. This is the principle of operation, for example, of the "Color Tec" system, sold by Ampex. See also the Anderson article referred to above. Thus, the color phase of the playback VTR's 12 will always be in phase with the 3.58 MHz plant reference, regardless if they are slowed down to alter the start of record to avoid a color frame mismatch.

Figure 4:
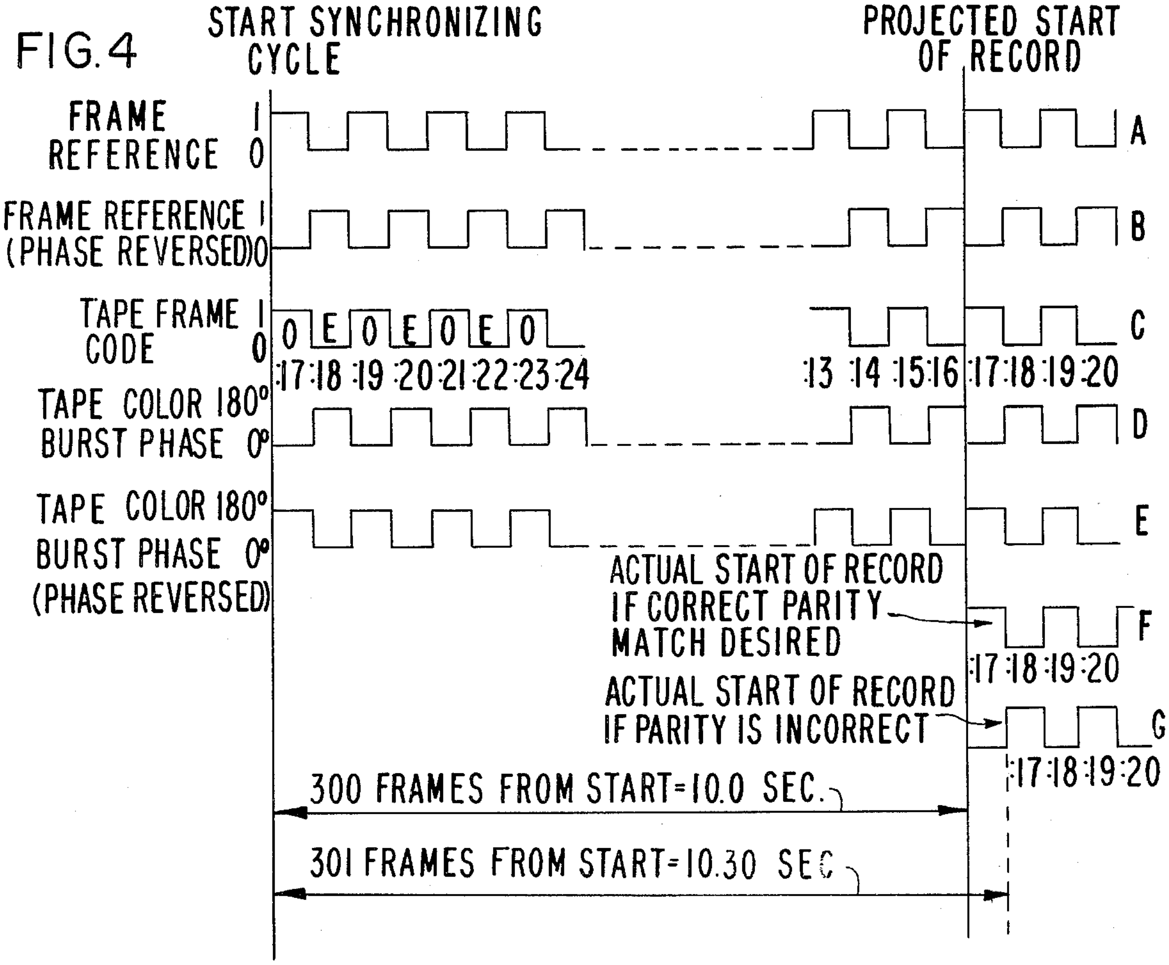
FIG. 4 is a graphical illustration of various signals and waveforms occurring in the operation of the system of FIG. 3.

For a better understanding of the operation of the improved color framing system 18 of the present invention, reference is made additionally to FIG. 4, which assumes the NTSC format. For purposes of illustration, in this example, the start of record is projected to occur 300 frames, or 10.0 sec. after the start of the synchronizing cycle, as indicated. However, if it is necessary to delay the start of record by one frame, in order to perfect proper color framing in the manner described, the actual start of record will occur 301 frames or 10-1/30 seconds after the start of the synchronization cycle.

Frame reference signal, indicative of the actual 3.58 MHz reference, from the divide-by-two circuit 22, is shown in FIGS. 4A and 4B. The waveform of FIG. 4A is 180° out of phase with that of FIG. 4B. As will be more fully explained, this illustrates the fact that for a given tape color phase, there is always a fifty-fifty probability that the reference phase will match the tape color burst phase the "first try".

A sample of the last two digits, i.e. the frame identification digits of the SMPTE time code, of the record tape is represented in FIG. 4C. As explained, it is a simple matter with this code to differentiate alternate frames; one only needs to look at the least significant digit to make an odd or even identification. Additionally, it is a very simple matter to determine at 26 whether the frame code is going to be odd or even at the projected start of record, since the frame code will be the same as that at the start of the synchronizing cycle if the projected start of record occurs an even number of frames later, such as 300. Of course, the frame code will be opposite to that of the start of synchronization if the projected start of synchronization occurs an odd number of frames later.

As previously explained, the frame code numbers bear no set phase relationship with the actual tape color burst phase, except whatever the relationship is, it stays that way for the length of the recording.

This may better be seen by reference to the examples of FIGS. 4D and 4E relative to the frame code of FIG. 4C. It can be seen there that the frame code designation can be either the same (FIG. 4E) or opposite (FIG. 4D) to the actual tape color burst phase.

Thus, whether or not there will be a proper phase match at the projected start of record when an insert is made into previously recorded material depends not only upon a comparison of the record tape frame code and the system frame reference, but also upon a prior determination of the relationship between the tape frame code and the actual tape color burst phase.

Accordingly, for making an insert into video material previously recorded on the record VTR 14, or to resume a previous edit session, the following procedure is followed. First, a trial edit is made. Then the phase match-up at the edit point is checked as the edit is replayed, using a Vectorscope or other suitable means.

If the color phase is correct after the edit, and there is a 50–50 chance this will be the case, the editor proceeds and the color frame system 18 guarantees that all of the subsequent edits in that session will be properly color phase matched.

Figure 3:
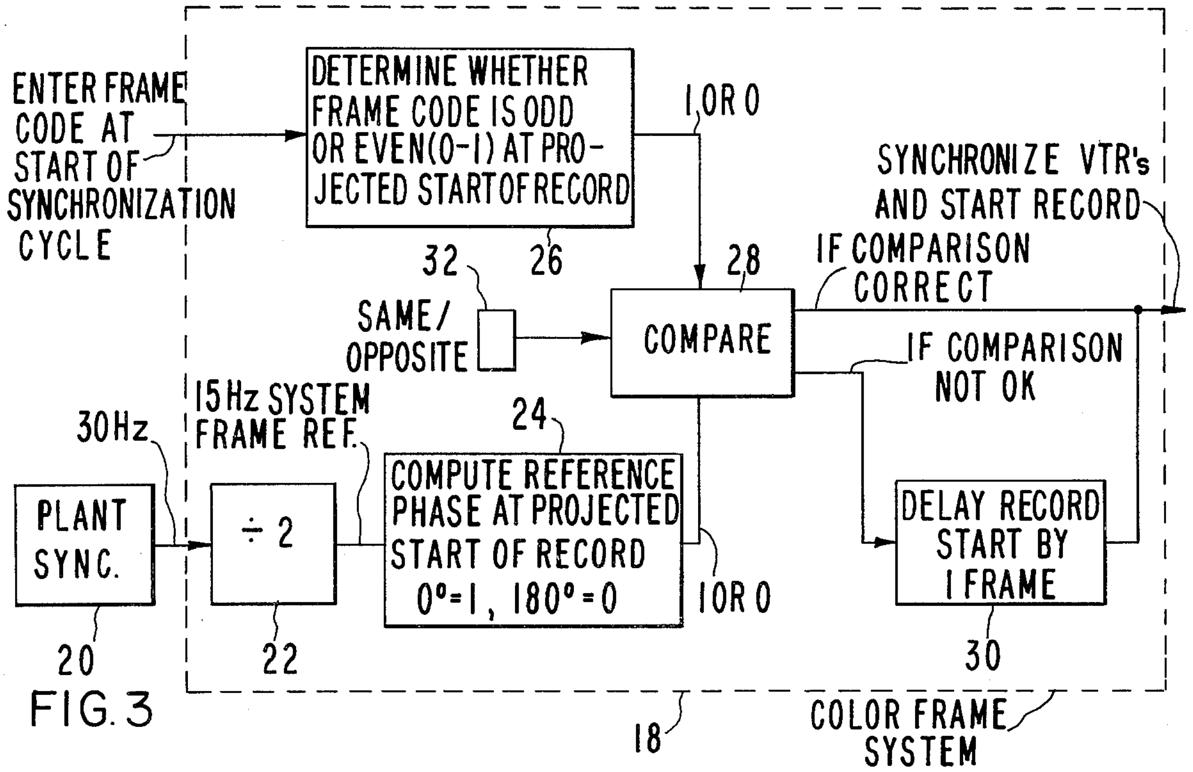
FIG. 3 is a more detailed block schematic of the improved color framing system of the present invention for use in a magnetic video tape editing system.

If the color phase match was found to be unsatisfactory, then the editor switches switch 32 (FIG. 3). This has the effect of reversing the decision of comparison means 28 to require that the parity of the frame code relative to the system frame reference be opposite to that which existed when the faulty trail edit occurred. The edit is then rerun and a good recording will occur, as will all future edits in that session.

At the start of an editing session where there has been no material previously recorded by the record VTR 14, no operator action is required since the color phase of the first recording is immaterial and since the color frame system 18 automatically controls the color phase so that all future edits in the same session are the same phase as the first recording.

For a better understanding of the foregoing procedure, the waveforms of FIG. 4 will now be examined for the situation where video material is to be transferred from a playback VTR 12 onto record VTR 14, where there has been a previous recording on VTR 14.

The frame code (FIG. 4C) may either be in parity with the actual record tape color phase (FIG. 4E) or be out of parity (FIG. 4D) as previously explained. First, consider what happens if the former situation occurs, i.e. the situation where the actual tape phase is as shown in FIG. 4E. When the operator makes a trial edit and if the system frame reference is as shown in FIG. 4A with respect to the frame code, i.e. there is a parity match, then the phase match of the trial edit will be correct, since the parity of the actual tape phase matches that of the frame code. Thus, the operator can proceed on.

But, if the system frame reference is as shown in FIG. 4B, then the trial edit will result in a phase mismatch since the frame reference will not be in parity with the frame code and hence the record tape color phase start of record. In this case, the operator pushes switch 32 after he discovers the phase mismatch. Now the comparison made at 28 will be made so that a "correct" result occurs when the frame code and frame reference are out of parity. The operator then reruns the recording, which will now be in phase, as will future recordings. Only now, a correct comparison will occur at 28 when the frame code and frame reference are opposite to one another.

Next, consider the situation where the frame code has the opposite phase to that of the record color phase, the situation shown in FIG. 4D. Here the situation is just reversed from the preceeding example. If the frame reference is as shown in FIG. 4B, while the frame reference will be in parity with the frame code, it will be out of parity with the record tape color phase, and hence a phase mismatch will occur, and the operator must enable switch 32 before proceeding.

If the frame reference is as shown in FIG. 4B, then while it will not be in parity with the frame code 4C, it will be in parity with the tape color burst phase. Hence, the edits will be correct from the start.

The foregoing is summarized in the following table:

Situation I

Where the frame code is in parity with the tape color phase (FIG. 4E):

1. If frame reference is as in FIG. 4A, then there will be a phase match at start of record; no operator action required.
2. If frame reference is as in FIG. 4B, then there will be a phase mismatch at start of record; operator enables switch 32 before proceeding.

Situation II

Where frame code is not in parity with the tape color phase (FIG. 4D):

1. If frame reference is as in FIG. 4A, then there will be a phase mismatch at start of record; operator enables switch 32 before proceeding.
2. If frame reference is an as FIG. 4B, then there will be a phase match at start of record; no operator action required.

Thus, the first trial edit is made, in effect, to determine the phase relationship between the frame code and the actual tape color phase. Once this relationship has been determined by the first trial edit, and the comparison 28 is programmed to determine what a correct comparision between the frame reference and frame code should be, the color frame system 18 will automatically insure that in future edits, color framing occurs in the manner previously described.

If, in the future, a universal time code is adopted which bears a fixed relationship to the tape color phase, then this first trial edit would no longer be necessary.

As previously explained, the functions carried out by blocks 20, 26 and 28 take place nearly instantaneously at the start of the synchronizing cycle. Thereafter, the regular editing system synchronization process takes over to force record VTR 14 as well as the other VTR's to arrive at the correct frame at the correct time.

In the event that the projected start of record must be altered by one frame, it is necessary to alter the record tape speed and/or position to either "gain" or "lose" one frame. One convenient way of accomplishing this is to slow down the record VTR to lose a frame, as explained previously. If, for example, the projected start of record is 300 frames after "start synchronization" and if the starting time is to be delayed by one frame, then the relationship of the average slower tape velocity, $V_S$, to the average normal or regular tape velocity is given by the relationship:

$$V_S = V_N (300/301) \quad (I)$$

Figures 5, 7:
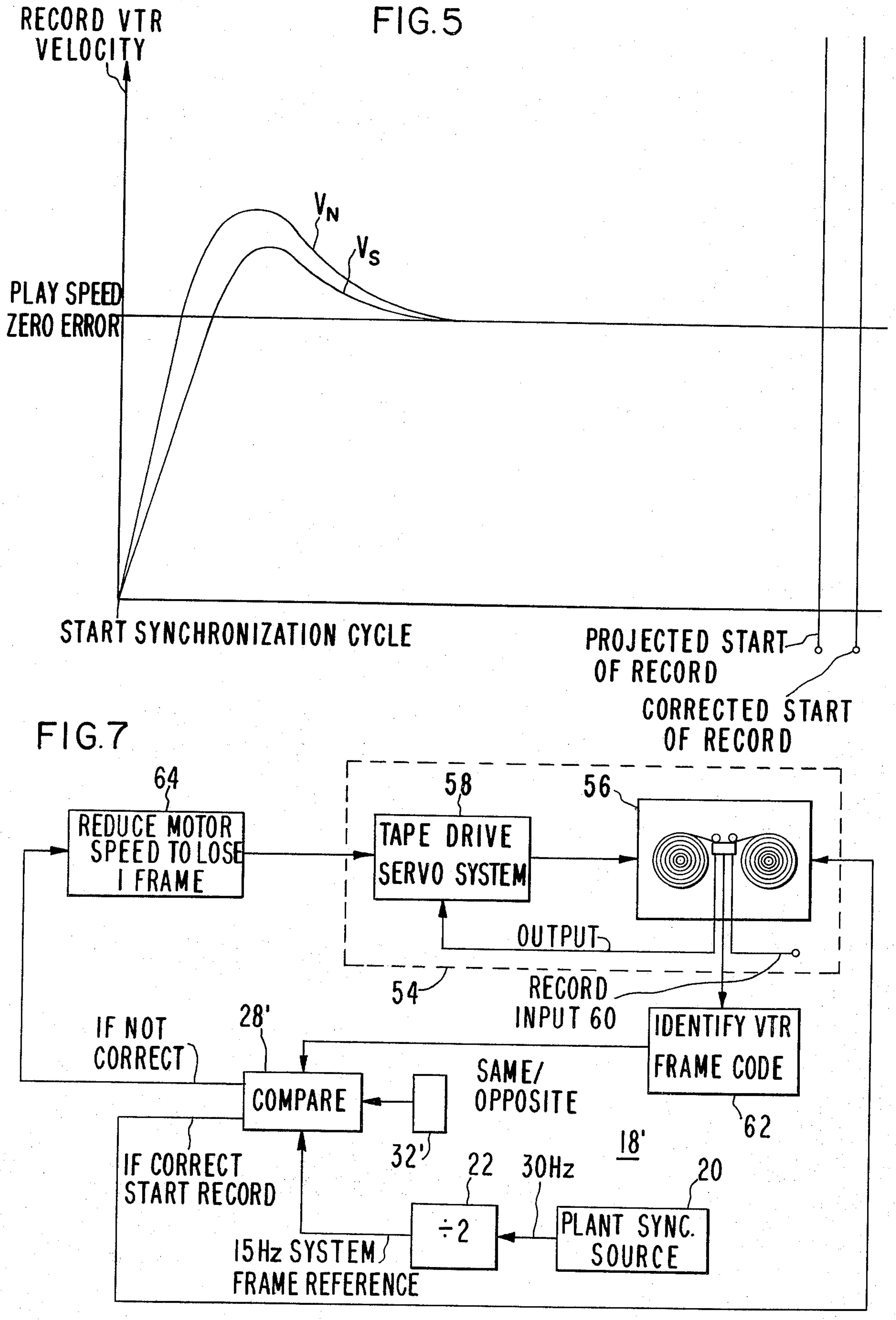
FIG. 5 is a graphical illustration depicting the relationship of the VTR velocity during the synchronization cycle.
FIG. 7 is a block schematic representation of a single VTR employing the improved color frame system of the present invention.

This relationship is depicted graphically in FIG. 5.

To reduce the velocity of the record tape, the capstan servo for the record VTR is regulated by controlling the electrical signal representing the VTR velocity error voltage E. One way to accomplish this is as follows. Prior to the start synchronization a number is registered indicative of the number of frames which must be counted down before the start of record. This value is positive, and as the synchronization process begins, the value of this number decreases until it finally reaches zero at the start of recording. This value is called the "D-register" value of D.

At the start of the synchronization process, the tape position, P, is also monitored. This is done simply by reading the time code of the tape. P starts with a value of zero, and adds a digit as the tape progresses by one frame.

The error signal E for controlling the VTR tape transport velocity can be derived from the above parameters P and D and from T, the targeted or projected start of record, by the following relationship:

$$E = T - P - D \quad (II)$$

where if $E > 0$ speed up capstan servo if $E < 0$ slow down capstan servo

For example, if the projected delay $D_1$ for start of record is 300 frames, but if it is necessary to delay actual start of record by one frame, then initially $D_2$ is set at +301 instead of +300, then the change of error, Equation III, becomes:

$$\Delta E = E_2 - E_1 \quad (III)$$

$$= (T - P - D_2) - (T - P - D_1)$$
$$= D_1 - D_2$$
$$= 300 - 301$$
$$= -1$$

where $\Delta E$ = change of error $D_1$ = Initial D-Register value $D_2$ = Revised D-Register value for color frame change Hence, since $\Delta E$ is negative the error signal slows down the capstan servo. Once the tape capstan has been slowed sufficiently so that one frame is lost, and E is zero, the recording takes place at the correct time and position.

As previously stated, the functions carried out by blocks 24, 26 and 28 can conveniently be carried out by a programmed digital computer when a computer is available such as in the CMX System 300 magnetic tape editor. The flow diagram of an actual program to carry out these functions is depicted in FIG. 6. Of course, this program is a straight-forward one which does not in itself form a part of the present invention. Rather, it is described herein to exemplify one way in which the functions of blocks 24, 26 and 28 can be carried out. Thus, for example, where a computer is not available, these functions can easily be carried out by hard wired logic circuitry which can be designed easily in a straight-forward manner.

As explained, the functions carried out by the flow diagram of FIG. 6 occur nearly instantaneously at the beginning of the synchronization cycle. Thus, the synchronization process described in the preceeding paragraphs occurs after the functions are performed by the flow diagram of FIG. 6.

Referring now to the flow diagram of FIG. 6, at the start of the synchronization cycle, block 34 causes the VTR's to start up and at the same time begins the D-register countdown explained above.

At block 36, the parity, i.e. the least significant binary bit, of the frame code of the record VTR tape is checked to determine its parity at the beginning of the record. This value is denoted R.

At block 38, the current parity, $P_1$, of the system reference phase is read, and at block 40, the parity of the reference phase is computed for the projected record start time. This latter value is denoted $P_2$.

Block 42 notes a change in parity of the user select button 32 and the actual parity of the user select command is determined at block 44.

The record start time parity R, the reference phase parity $P_2$, and the user select parity U are added together at block 46 to produce a sum S. Decision block 48 checks the parity of this sum S. If it is odd, then the record start time is delayed one frame and the binary digit 1 is added by block 50 so that the output parity is even, which is the required parity indicative of a proper phase match. If the parity of S is already even, indicating proper phase match, then nothing further is done.

To effectuate the delay of the record start time, block 50 also increases the absolute value of D in equation II above by "one" when the parity check of S reveals an odd number. As explained above, this automatically insures that the tape capstan is slowed down to lose a frame in time.

As previously stated, the present invention is applicable not only in video tape editing systems but also for use in a single VTR where color phase matching is required. FIG. 7 is a system schematic illustration of a single standard VTR 54 incorporating the present invention. VTR 54 includes a tape drive 56 and a tape drive servo system 58 which includes a sync signal comparator and time base corrector for controlling a capstan drive motor in the tape drive 56.

The improved color frame system 18' of the present invention is provided to insure proper color phase matching for video signals, from a television camera or other VTR, introduced through the input 60 to be recorded by VTR 54. A 15 Hz system frame reference is again derived by sending the 30 Hz sync reference signal from plant sync source 20 through a divide-by-two circuit 22. This 15 Hz frame reference signal is sent to a comparison circuit 28'.

Prior to recording new video signals, VTR 54 is run back a sufficient number of frames so that VTR 54 is brought up to apeed and to allow the following sequence to take place before VTR 54 reaches the point or frame where the new recording is to take place. Typically, VTR 54 must be rewound to allow 2–10 seconds of VTR operation prior to the time the recording begins.

During this time, the frame code signals are picked up from the tape drive head and are identified at 62 and sent to the comparison circuit 28'. This is a signal like that shown in FIG. 4C. Comparison circuit 28' then compares the two sets of signals sent to it. If they bear the correct relationship, then the VTR 54 is enabled, synchronized and the recording begins at the end of the previously recorded segment.

If the frame code and system frame reference do not bear the correct relationship, motor speed reducing circuit 64 controls the drive motor speed to lose one frame in time, i.e. to put the frame code in the proper relationship with the system frame reference. Once this occurs, compare circuit 28' enables VTR 54 and the recording is made.

A trial run must be made where an insert is to be made into previously recorded material. The procedure is the same as with the aforementioned editing system; after making the trial run and checking the color phase match, switch 32' is pushed by the operator if improper color framing was indicated.

With the color frame corrector 18' installed with VTR 54, VTR 54 can serve as the record VTR in an editing system. To prevent possible picture shifts introduced by the time base correctors of the playback VTR's, the playback VTR's can be equipped with similar color phase correctors 18'.

In the preceding embodiments, systems were described wherein the tape drive motor was slowed down in order to slip one frame in time. It should be understood, however, that the drive motor could be speeded up to "pick up" an additional frame or frames, and the same objective would be accomplished. In fact, in the case of the NTSC, what is important is that an odd number of frames be lost or picked up.

The SMPTE time code recorded on the cue-track of a 4-track video tape is a convenient way of identifying alternate frames recorded on the tape. However, other means for identifying alternate frames could be employed. For example, alternate frame identification could be inserted within the video sync or within the control track. Additionally, other forms of identification could be used such as a high frequency signal encoded in the audio track or by physically marking the tape.

I claim:

1. A color frame system for use with a video tape recorder/reproducer for providing proper color burst phase matching comprising:

a. means for identifying alternate frames of video recorded on the recording tape;

b. means for detecting the alternate-frame identifications to generate alternate-frame identification signals to distinguish alternate frames recorded on the tape;

c. means synchronized with a stable signal source for generating frame reference signals at a frequency to provide means for distinguishing alternate video frames in time relative to said stable signal source;

d. means for comparing said alternate-frame identification signals and said frame reference signals; and e. means responive to said comparison means to control the tape speed and/or position for correcting the recording tape frame position relative to said frame reference signal if required for proper color burst phase match.

2. A color frame system as in claim 1 wherein said tape speed and/or position control means comprises means for altering the recording tape frame position one frame relative to said frame reference signal.

3. A color frame system as in claim 2 wherein said frame reference generating means provides a 15 Hz signal.

4. A color frame system as in claim 3 wherein said alternate frame identification means comprises the SMPTE time code, and wherein alternate frames are identified odd and even in accordance with the least significant digit thereof.

5. A color frame system as in claim 1 wherein said frame reference generating means provides a 15 Hz signal.

6. A color frame system as in claim 1 wherein said alternate frame identificatin means comprises the SMPTE time code, and wherein alternate frames are identified odd and even in accordance with the least significant digit thereof.

7. In a magnetic tape editing system having a record video tape recorder, at least one playback video tape recorder synchronized with said record video tape recorder and whose color burst phase is automatically maintained in phase with a stable color reference signal, and a system for providing proper color burst phase matching of video segments recorded upon said record video tape recorder comprising:

a. means for identifying alternate frames of video recorded on the recording tape;

b. means for determining the alternate-frame identification of the video frame which will occur at a projected time when video information signals are to begin to be recorded upon said record tape;

c. means synchronized with a stable signal source for generating frame reference signals at a frequency to provide means for distinguishing alternate video frames in time relative to said stable signal source;

d. means for determining the state of said frame reference signals which is scheduled to occur at the projected time video information signals are to begin to be recorded upon said record tape;

e. means for comparing the scheduled frame reference state with the determined alternate-frame identification at the projected beginning of the record of video information signals; and f. means responsive to said comparison means to alter in time the actual start of record if required for proper color burst match.

8. A magnetic tape editing system as in claim 7 wherein said means for altering the start of record alters the start time by one frame.

9. A magnetic tape editing system as in claim 7 wherein said means for altering the start of record delays the start time by one frame.

10. A magnetic tape system as in claim 9 wherein said frame reference generating means provides a 15 Hz signal.

11. A magnetic tape editing system as in claim 10 wherein said alternate frame identification means comprises the SMPTE time code, and wherein alternate frames are identified odd and even in accordance with the least significant digit thereof.

12. A magnetic tape system as in claim 7 wherein said frame reference generating means provides a 15 Hz signal.

13. A magnetic tape editing system as in claim 7 wherein said alternate frame identification means comprises the SMPTE time code, and wherein alternate frames are identified odd and even in accordance with the least significant digit thereof.

14. A method for use with a video tape recorder/reproducer for providing proper color burst phase matching comprising the steps of:

a. identifying alternate frames of video recorded on the recording tape;

b. detecting the alternate frame identifications and generating alternate-frame identification signals to distinguish alternate frames recorded on the tape;

c. generating a frame reference signal synchronized with a stable signal source at a frequency for distinguishing alternate video frames in time relative to said stable signal source;

d. comparing said alternate-frame identification signals and said frame reference signals; and e. controlling the tape speed and/or position for correcting the recording tape frame position relative to said frame reference signal after said comparison step if required for proper color burst phase match.

15. In a video tape recording system, means for insuring proper color phase matching comprising:

means for coding each video recording to identify alternate video frames to provide a synthetic color phase reference;

means for comparing the color phase of a video segment to be recorded with the synthetic phase reference; and means responsive to said comparison means to control the tape speed or position for correcting the recording tape frame position relative to the color phase of the video segment to be recorded when required.

16. A video tape recording system as in claim 15 wherein the color phase of the video segment to be recorded is locked to a system color phase reference signal.

* * * * *

UNITED STATES PATENT AND TRADEMARK OFFICE
CERTIFICATE OF CORRECTION

PATENT NO. : 3,890,638
DATED : June 17, 1975
INVENTOR(S) : DAVID W. BARGEN

It is certified that error appears in the above-identified patent and that said Letters Patent are hereby corrected as shown below:

Fig. 2, line A: the bracket labeled "1/30 SEC" should encompass only the frame enclosing the numeral 1 and not frames 1 and 2 as illustrated;

Fig. 4, line F: the arrow labeled "Actual Start of Record if Correct Parity Match Desired" should point to and stop at the vertical line labeled "Projected Start of Record" and should not project therebeyond.

Column 5, line 5, "Fig. 2D" should read "Fig. 2E".

Column 7, line 31, "trail" should read "trial".

Column 10, line 57, the word "apeed" should read "speed".

Signed and Sealed this

Ninth Day of November 1976

[SEAL]

*Attest:*

RUTH C. MASON
*Attesting Officer*

C. MARSHALL DANN
*Commissioner of Patents and Trademarks*